Sept. 15, 1959    E. R. BERGMANN ET AL    2,904,164

EXTENSIBLE BELT CONVEYORS

Filed May 8, 1957

INVENTOR.
Ernst R. Bergmann
BY    John R. Madeira

Murray A. Gleeson
ATTORNEY

United States Patent Office 2,904,164
Patented Sept. 15, 1959

2,904,164

EXTENSIBLE BELT CONVEYORS

Ernst R. Bergmann, Evergreen Park, and John R. Madeira, Chicago, Ill., assignors to Goodman Manufacturing Company, Chicago, Ill., a corporation of Illinois Application May 8, 1957, Serial No. 657,952

6 Claims. (Cl. 198—139)

This invention relates to extensible belt conveyors and more particularly to improvements in structure for storing and guiding the idler assemblies of the belt storage loops both during tramming and locating, and during setup and operation of the conveyor.

This application is directed to the invention described but not claimed in our copending application Serial No. 551,317, filed December 6, 1955 for Belt Conveyors, now Patent No. 2,808,145, and also to an improvement over such invention described therein.

It is a principal object of this invention to provide an improved extensible belt conveyor characterized by an end section therefor having support rails for movement of an idler carriage of the belt storage loop, such support rails being of a length so as to support a pair of idler assemblies during tramming movement of the end section and being inclined to a position whereby the assemblies are maintained against unintended shifting.

Another object of the invention is to provide a pair of rails for an end section of an extensible conveyor for storing the idler assemblies and to provide means for pivoting the rails to a position where the assemblies cannot roll off the ends of the rails.

Other objects and important features of the invention will be apparent from a study of the specification following taken with the drawing which together describe and illustrate a preferred embodiment of the invention, and what is now considered to be the best mode of practicing the principles thereof. Other embodiments may be suggested to those having the benefit of the teachings herein and such other embodiments are intended to be reserved especially as they fall within the scope and spirit of the subjoined claims.

Figure 1:
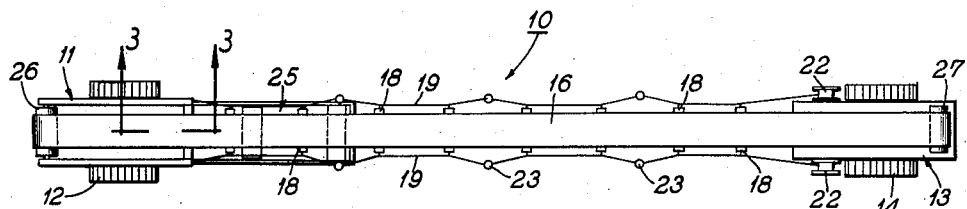
Fig. 1 is a schematic plan view of an extensible belt conveyor having the improvements according to the present invention embodied therein.

Referring now to Fig. 1 of the drawings, the improvements according to the present invention are embodied in an extensible conveyor indicated generally by the reference numeral 10 and including a head section 11 mounted for movement upon crawler treads 12 and a tail section 13 mounted upon crawler treads 14. An endless belt extends between the head section 11 and the tail section 13 and includes a conveying reach 16 and a return reach 17, see Fig. 2. The conveying reach 16 is supported upon idler assemblies 18 which extend between laterally spaced rope strands 19, one end of the rope strands 19 being secured at an abutment 21 on the head section 11 and the other end of such rope strands being wound upon storage reels 22 at the tail section 13.

Figure 2:
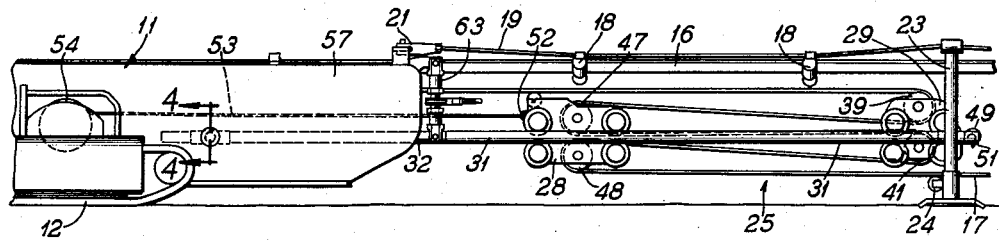
Fig. 2 is a side elevation view of the head section of the conveyor seen in Fig. 1, said head section having the improvements according to the present invention embodied therein.

The rope strands 19 are supported at intervals throughout their length upon standards 23, which standards also have idler rollers 24 for support of the return reach, see also Fig. 2.

The conveying reach 16 of the endless belt is driven by a driving pulley 26 at the head section 11 and is reversed in direction around an idler pulley 27 at the tail section 13.

The tail section 13 is arranged to follow the advance of the working face of a seam of coal or the like, the tail section moving upon its endless crawler treads 14. In so doing the storage reels 22 pay out additional lengths of rope strand 19. In order to accommodate such lengthening of the endless conveyor 10 the endless belt is provided with a storage loop in the return reach 17, indicated generally by the reference numeral 25, which storage loop 25 shortens in accordance with the advance of the tail section 13.

Figure 3:
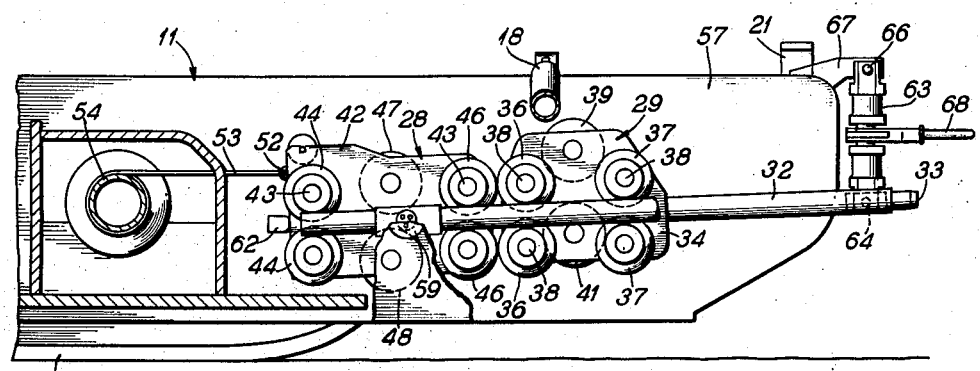
Fig. 3 is an elevation view taken substantially along the line 3—3 of Fig. 1 looking in the direction of the arrows.

The storage loop 25 is formed by reeving the return reach 17 back and forth between a pair of idler carriages indicated generally by the reference numerals 28 and 29. These idler carriages are arranged to move relative to each other upon support means, such as laterally spaced pairs of rail means 31 and 32. The rails 31 are supported by the standards 23 and the rail members 32 with the rail members 32 being supported by the head section 11, the rail means 31 and 32 being in the form of hollow tubes, and rail members 32 having a boss 33 extending from the end thereof arranged to telescope with the rail 31 as seen also in Fig. 3.

Figure 4:
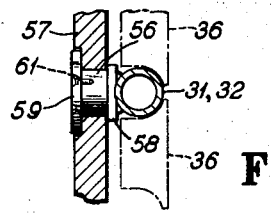
Fig. 4 is a section taken along the line 4—4 of Fig. 2.

Idler carriage 29 includes a pair of end frames 34 having spaced pairs of wheels 36 and 37 turning on stub axles 38 supported by the end frames 34 and arranged to straddle the rails 31 and 32 as seen in Fig. 4 to guide carriage 29.

Idler rollers 39 and 41 extend between the end frames 34 and the return reach 17 is reeved therearound as seen in Fig. 2.

Idler carriage 28 likewise includes spaced end frames 42, and is provided with stub axles 43 which support spaced pairs of wheels 44 and 46 which embrace the rails 31 or 32 in a fashion as seen in Fig. 4. Idler rollers 47 and 48 are supported by the end frames 42 and extend therebetween, and have the return reach 17 of the belt reeved therearound as seen in Fig. 2.

During operation of the conveyor the idler carriage 29 is anchored as at 49 to a cross member 51 extending between the rails 31 at the ends thereof, such cross members 51 being at the support standards 23. The movable idler carriage 28 is connected at 52 to a cable 53 wound upon a winch drum 54 which winds up or pays out the cable 53 in accordance with the length of the belt storage loop 25, the drum 54 maintaining a proper tension upon the cable 53 and upon the strands of belt at the storage loop 25.

When the conveyor 10 is dismantled the end sections 11 and 13 may be moved upon their respective crawler treads 12 and 14 to another working location. The head section 11 is arranged to store the two idler carriages 28 and 29 during such tramming movement and in such a fashion that they cannot be dislodged from the head section 11 during such movement. The rails 32 are accordingly mounted for pivotal movement in a vertical plane upon pivot supports 56 turning in side frames 57 of the head section 11, see Fig. 4.

Pivoting support 56 has an end flange 58 bearing against the inner wall of the side frame 57 and an opposed and spaced end flange 59 held by screws 61 to the support 56 and bearing against the outer face of the frame 57. The rails can be pivoted in a vertical plane about the supports 56 to a position where the two idler carriages 28 and 29 are contiguous to each other, carriage 28 moving into contact with a stop 62.

The rails 32 are moved to the tilted position shown by means of a double screw jack 63 having a pivotal connection at 64 to the outside of the rail 32 so as not to interfere with movement of the wheels 36, 37, 44 or 46 for the passage of the carriages 28 and 29 past the jack 63. The jack 63 also has a pivotal connection at 66 to a bracket 67 on the upper edge of the side frame 57, the jack 63 being operated by a handle 68. The rails 32 may thus be raised to the position shown by operating the jack 63 to prevent the idler assemblies 28 and 29 from movement from off the ends of the rails 32 during the tramming of the head section 11. Upon reassembling of the conveyor 10 as seen in Fig. 1, the jack 63 may also be employed to align the rail 32 with its cooperating rail 31.

Thereafter, the fixed idler assembly 29 can be moved to its operating position as seen in Fig. 2, the movable idler assembly 28 then adopting positions as seen in Fig. 2 of movement along the rails 31 and 32.

While the invention has been described in terms of a preferred embodiment thereof its scope is intended to be limited only by the claims here appended.

We claim as our invention:

1. An extensible belt conveyor comprising, in combination, a head section, a tail section, a belt having a conveying reach and a return reach extending between said sections, means for supporting said belt, means for tramming said tail section relative to the head section to vary the effective working length of the conveyor, means including a plurality of idler carriages movable relative to each other and having the belt reeved therebetween to enable the effective length of the belt to be varied in response to the tramming of the tail section, means for tramming said head section between working locations, support means for supporting the idler carriages during the tramming of both sections, said support means comprising a pair of laterally spaced elongated rail members, pivot means adjacent one end portion of each rail member for pivotally connecting the respective rail member to the head section for generally vertical pivotal movement of the free end portions about a substantially horizontal axis between a generally horizontally disposed idler carriage operative position and a generally vertically upwardly tilted idler carriage storage position, other rail means removably secured to each free end portion of the rail members and supporting the idler carriages in said operative position, said idler carriages being supported on said rail members in said storage position with the free end portions of the rail members being tilted generally vertically upwardly and the rail means being removed therefrom, and means including a jack pivotally mounted between the head section and the respective rail members for pivotally moving said rail members between the operative position and the tilted storage position.

2. An extensible belt conveyor comprising a movable end section, a belt trained about said end section, means for varying the effective working length of the conveyor, means including movable idler carriages enabling the effective length of the belt to be varied in accordance with the working length of the conveyor, elongated support means for supporting said idler carriages, pivot means adjacent one end portion of the support means pivotally connecting the support means to the end section for pivotal movement of the free end portion thereof between a generally horizontally disposed idler carriage operative position and an upwardly tilted idler carriage storage position, means including a jack for pivotally moving the support means between the positions, and means for tramming the end section between working locations with the idler carriages being supported on the support means and the support means being disposed in the upwardly tilted idler carriage storage position.

3. In an extensible belt conveyor including a belt, a movable end section about which said belt is trained and means including movable idler carriages having the belt reeved thereabout to enable the effective length of the belt to be varied in accordance with the working length of the conveyor and means for tramming said end section between working locations, the improvement comprising in combination with said end section, support means for storage of the idler carriages during the tramming of the end section, said support means including rail members for movably supporting the idler carriages, pivot means connecting said rail members to the end section for pivotal movement between an idler carriage operative position and an idler carriage storage position, and means for pivotally moving said rail members between said positions.

4. A movable head section for an extensible belt conveyor having means including movable idler carriages for storing the belt of such conveyor in accordance with the effective working length thereof, means for tramming the end section between working locations, elongated support means adapted to support the idler carriages during the tramming of the head section, said support means including a pair of laterally spaced elongated rail members, pivot means adjacent one end portion of each rail member for pivotally connecting the respective rail member to the head section for generally vertical pivotal movement of the free end portions thereof about a substantially horizontal axis between a generally horizontally disposed idler carriage operative position and a generally vertically upwardly tilted idler carriage storage position, other rail means removably secured to each free end portion of the rail members and adapted to support such idler carriages in the operative position, said rail members being adapted to support such idler carriages in the storage position with the free end portions thereof being tilted generally vertically upwardly and the other rail means being removed therefrom, and means for pivotally moving said rail members between the operative position and the tilted storage position.

5. A movable end section for an extensible belt conveyor having means including movable idler carriages for storing the belt of such conveyor in accordance with the effective working length thereof, means for tramming the end section between working locations, elongated support means adapted to support the idler carriages during the tramming of said end section, pivot means pivotally connecting the support means to the end section for pivotal movement of the free end portion thereof between a generally horizontally disposed idler carriage operative position and an upwardly tilted idler carriage storage position, and means for pivotally moving the support means between the positions whereby the idler carriages are supported by the support means during the tramming of the end section with the support means being disposed in the upwardly tilted idler carriage storage position.

6. In a movable end section for an extensible belt conveyor having means including movable idler carriages for storing the belting of such conveyor in accordance with the effective working length thereof and means for tramming the end section between working locations, the improvement in such end section which comprises; support means for storing such idler carriages during the tramming of the end section, pivot means connecting the support means to the end section for pivotal movement between an idler carriage operative position and an idler carriage storage position, and means for moving said support means between the operative and storage positions.

References Cited in the file of this patent

UNITED STATES PATENTS

| | | |
|---|---|---|
| 1,550,140 | Bennington | Aug. 18, 1925 |
| 1,764,143 | Bankson | June 17, 1930 |